United States Patent [19]
Itoh et al.

[11] Patent Number: 5,939,500
[45] Date of Patent: Aug. 17, 1999

[54] HYDROGEN-FUNCTIONAL SILYLATED POLYMETHYLSILSESQUIOXANE

[75] Inventors: Maki Itoh, Kanagawa; Akihito Sakakibara-Saitoh, Shizuoka; Michitaka Suto, Kanagawa, all of Japan

[73] Assignee: Dow Corning Asia, Ltd, Tokyo, Japan

[21] Appl. No.: 09/027,548

[22] Filed: Feb. 23, 1998

[51] Int. Cl.$^6$ .................................................. C08F 283/12
[52] U.S. Cl. ........................... 525/478; 525/477; 528/31; 528/34; 528/32; 528/15
[58] Field of Search ................................... 525/477, 478; 528/31, 32, 34, 15

[56] References Cited

U.S. PATENT DOCUMENTS

| | | | |
|---|---|---|---|
| 4,399,266 | 8/1983 | Matsumura | 528/10 |
| 4,652,618 | 3/1987 | Sumida et al. | 525/478 |
| 4,895,914 | 1/1990 | Saitoh et al. | 525/478 |
| 5,491,203 | 2/1996 | Matsui et al. | 525/474 |

FOREIGN PATENT DOCUMENTS

| | | |
|---|---|---|
| 0406911 | 1/1991 | European Pat. Off. . |
| 786489 | 8/1996 | European Pat. Off. . |
| 60-17214 | 5/1985 | Japan . |
| 61-221232 | 10/1986 | Japan . |
| 62-16212 | 4/1987 | Japan . |
| 1-43773 | 9/1989 | Japan . |
| 3-20331 | 1/1991 | Japan . |
| 3-227321 | 10/1991 | Japan . |
| 5-125187 | 5/1993 | Japan . |
| 6-279586 | 10/1994 | Japan . |
| 6-287307 | 10/1994 | Japan . |
| 7-70321 | 3/1995 | Japan . |
| 9707164 | 2/1991 | WIPO . |

OTHER PUBLICATIONS

"Shirikoon Handobukke" (Silicone Handbook), edited by Kunio Itoh, published by Nikkan Kogyo Shinbunsha 1990.
J. Am. Chem. Soc., 1990, vol. 112, pp. 1931–1936.
Chem. Rev., 1995, vol. 95, pp. 1409–1430.

*Primary Examiner*—Robert Dawson
*Assistant Examiner*—Caixia Lu-Rutt
*Attorney, Agent, or Firm*—Arne R. Jarnholm; Timothy J. Troy

[57] ABSTRACT

A hydrogen-functional silylated polymethylsilsesquioxane that contains no more than 0.12 residual silanol per Si atom and is obtained by silylating the silanol in starting polymethylsilsesquioxane. The starting polymethylsilsesquioxane has a predetermined number average molecular weight, Mn, from 380 to 2,000 and is represented by the general formula $$(CH_3SiO_{3/2})_n(CH_3Si(OH)O_{2/2})_m$$

wherein $\underline{m}$ and $\underline{n}$ are positive numbers that provide the predetermined Mn, with the proviso that the value of $\underline{m}/(\underline{m}+\underline{n})$ is less than or equal to $0.152/(Mn \times 10^{-3})+0.10$ and greater than or equal to $0.034/(Mn \times 10^{-3})$. The hydrogen-functional silylated polymethylsilsesquioxane has the formula $$(CH_3SiO_{3/2})_n(CH_3Si(OH)O_{2/2})_{m-k}(CH_3Si(OSiR^1R^2R^3)O_{2/2})_k$$

wherein $\underline{k}$ is a positive number smaller than $\underline{m}$, $(\underline{m}-\underline{k})/(\underline{m}+\underline{n})$ is less than or equal to 0.12, and $R^1$, $R^2$, and $R^3$ are each selected from substituted and unsubstituted monovalent hydrocarbon groups with the proviso that at least 1 of said $R^1$, $R^2$, and $R^3$ is hydrogen.

3 Claims, 1 Drawing Sheet

HYDROGEN-FUNCTIONAL SILYLATED POLYMETHYLSILSESQUIOXANE

BACKGROUND OF THE INVENTION

1. Field of the Invention

This invention relates to hydrogen-functional polymethylsilsesquioxane, to a method for its preparation, and to curable compositions that use said reactive group-functional polymethylsilsesquioxane.

2. Description of the Prior Art

Silicone resins that contain 1.5 oxygen atoms per silicon atom are generically known as polyorganosilsesquioxanes. Polymethylsilsequioxanes are highly heat resistant and exhibit good electrical insulation properties and flame retardancy, and this good property spectrum has resulted in their use as resist materials and interlayer dielectric films in semiconductor fabrication (see, among others, "Shirikoon Handobukku" (English title: Silicone Handbook), edited by Kunio Itoh, published by Nikkan Kogyo Shinbunsha (1990)).

Methods are already known for the synthesis of polymethylsilsesquioxanes. For example, polymethylsilsesquioxane can be synthesized by dissolving methyltrichlorosilane in the presence of amine in a single solvent or mixture of solvents selected from ketones and ethers, adding water to this system dropwise to effect hydrolysis, and then heating to effect condensation (see Japanese Patent Publication (Kokoku) Numbers Sho 60-17214 (17,214/1985) and Hei 1-43773 (43,773/1989) and U.S. Pat. No. 4,399,266). Another synthesis example is taught in EP 0406 911 Al and Japanese Patent Publication (Kokoku) Number Sho 62-16212 (16,212/1987). These references teach the dissolution of a trifunctional methylsilane in organic solvent; then hydrolysis by the dropwise addition of water to this solution at a temperature from −20° C. to −50° C. under an inert gas pressure of 1,000 to 3,000 Pa; and thereafter condensation by heating. Yet another synthesis example is disclosed in Japanese Patent Application Laid Open (Kokai or Unexamined) Number Hei 3-20331 (20,331/1991). This reference teaches the reaction in organic solvent of methyltriacetoxysilane with an equivalent amount of alcohol and/or water to synthesize the alkoxyacetoxysilane; polycondensation of the alkoxyacetoxysilane in organic solvent in the presence of sodium bicarbonate to give a prepolymer; and condensation of this prepolymer by heating in the presence of at least I catalyst selected from the alkali metal hydroxides, alkaline-earth metal hydroxides, alkali metal fluorides, alkaline-earth metal fluorides, and triethylamine. Still another synthesis example is found in Japanese Patent Application Laid Open (Kokai or Unexamined) Number Hei 3-227321 (227,321/1991). This reference teaches the dissolution of alkali metal carboxylate and lower alcohol in a mixed liquid system that forms two phases (water and hydrocarbon solvent); the dropwise addition of methyltrihalosilane into this system to effect hydrolysis; and condensation by heating.

The polymethylsilsesquioxanes afforded by these methods share a characteristic feature: they are hard but brittle. Some of the preceding references even include tactics for addressing this problem. Japanese Patent Publication (Kokoku) Number Hei 1-43773 instructs regulating the fraction with molecular weight$\leq$20,000 (molecular weight as determined by gel permeation chromatography (GPC) calibrated with polystyrene standards) to 15 to 30 weight % of the polymethylsilsesquioxane. However, even this does no more than enable the preparation of coatings with thicknesses of about 1.8 to 2.0 $\mu$m. Similarly, the technology in EP 0 406 911 A1 can only provide coatings with maximum thicknesses of 3 to 3.5 $\mu$m without cracking. At larger film thicknesses cracking occurs, and of course the flexibility that would permit the fabrication of an independent or stand-alone film is absent.

We have already discovered (see EP 786 489 Al and WO 9707164) that a coating that combines flexibility with high thermal stability is provided by the cure of a polymethylsilsesquioxane having a molecular weight and hydroxyl content in specific ranges and preferably prepared by a special method.

On the subject of the silylation of the residual silanol in polysilsesquioxane, a synthetic method for this is disclosed in, for example, *J. Am. Chem. Soc.,* 1990, Volume 112, pages 1931 to 1936. Japanese Patent Application Laid Open (Kokai or Unexamined) Number Sho 61-221232 (221,232/1986) teaches a method for the preparation of silylated polysilsesquioxane comprising the use of silylating agent to terminate the reaction in the polysilsesquioxane synthesis method of EP 0 406 911 Al and Japanese Patent Publication (Kokoku) Number Sho 62-16212. Japanese Patent Application Laid Open (Kokai or Unexamined) Numbers Hei 6-279586 (279,586/1994), Hei 6-287307 (287,307/1994), and Hei 7-70321 (70,321/1995) teach that stabilization can be achieved and gelation can be avoided by trimethylsilylation of the hydroxyl in polysilsesquioxane in which methyl constitutes 50 to 99.9 mole % of the pendant organic groups and crosslinking-reactive groups are present in the remaining organic groups. However, even without silylation the polymethylsilsesquioxane disclosed by us in EP 786 489 Al and WO 9707164 does not gel during its preparation and can be stably stored at room temperature. Japanese Patent Application Laid Open (Kokai or Unexamined) Number Hei 5-125187 (125,187/1993) teaches that an increased storage stability can be obtained by trialkylsilylation of the hydroxyl in polysilsesquioxane having Mn$\geq$100,000 and methyl as 50 to 100 mole % of its pendant organic groups. The above-referenced Japanese Patent Publication (Kokoku) Number Sho 62-16212 also teaches that silylation of the hydroxyl in polymethylsilsesquioxane improves stability.

On the subject of the organic groups in silsesquioxanes, silsesquioxanes functionalized with various crosslinking-reactive groups are described in, for example, *Chem. Rev.,* 1995, Volume 95, pages 1409 to 1430.

SUMMARY OF THE INVENTION

We have already discovered (see EP 786 489 Al and WO 9707164) that a coating that combines flexibility with high thermal stability is provided by the cure of a polymethylsilsesquioxane having a molecular weight and hydroxyl content in specific ranges and preferably prepared by a special method. The polymethylsilsesquioxane disclosed by us in those publications contains a large amount of silanol but also exhibits an excellent storage stability. The cured products afforded by this polymethylsilsesquioxane exhibit a very high heat stability and also exhibit a flexibility that is largely unachievable by the cured products afforded by prior polymethylsilsesquioxanes. This high heat stability can be explained, inter alia, by the fact that a high post-cure crosslink density is obtained. This phenomenon should stand in direct opposition to the manifestation of flexibility by the cured film, and the manifestation of both these properties, i.e., flexibility and heat stability, is a unique characteristic of the polymethylsilsesquioxane under consideration. The object of the present invention is to provide a method for imparting functionality (the capacity to crosslink with the matrix polymer when the polymethylsilsesquioxane is used as a filler or additive for polymers or the ability for the subject polymethylsilsesquioxane to undergo cure by polyaddition or addition polymerization) to the subject polymethylsilsesquioxane with its unique characteristics by equipping it with hydrogen-functional groups.

The composition of the invention comprises a hydrogen-functional silylated polymethylsilsesquioxane. The composition of the invention is prepared by silylating the silanol groups in a starting polymethylsilsesquioxane having a predetermined number average molecular weight, Mn, from 380 to 2,000, as determined by gel permeation chromatography calibrated with polystyrene standards. The starting polymethylsilsesquioxane composition is represented by the general formula $$(CH_3SiO_{3/2})_n(CH_3Si(OH)O_{2/2})_m$$

wherein $\underline{m}$ and $\underline{n}$ are positive numbers that provide the predetermined Mn, with the proviso that the value of $\underline{m}/(\underline{m}+\underline{n})$ is less than or equal to $0.152/(Mn \times 10^{-3})+0.10$ and greater than or equal to $0.0341(Mn \times 10^{-3})$. Hence, the boundary conditions for the starting polymethylsilsesquioxane are known and can be represented graphically.

The hydrogen-functional silylated polymethylsilsesquioxane of the invention has the formula $$(CH_3SiO_{3/2})_n(CH_3Si(OH)O_{2/2})_{m-k}(CH_3Si(OSiR^1R^2R^3)O_{2/2})_k$$

wherein $\underline{k}$ is a positive number smaller than $\underline{m}$, $(\underline{m}-\underline{k})/(\underline{m}+\underline{n})$ is less than or equal to 0.12, and $R^1$, $R^2$, and $R^3$ are each selected from the group consisting of substituted and unsubstituted monovalent hydrocarbon groups wherein at least one of said $R^1$, $R^2$, and $R^3$ is a hydrogen atom.

The present invention also encompasses the hydrogen-functional silylated polymethylsilsesquioxane synthesized by the above-described method and compositions comprising the hydrogen-functional silylated polymethylsilsesquioxane in combination with a polyorganosiloxane reactive therewith.

$$\underline{m}/(\underline{m}+n)=0.152/(Mn \times 10^{-3})+0.10 \quad (1)$$

$$1/(Mn \times 10^{-3})=1000/2000 \quad (2)$$

$$1/(Mn \times 10^{-3})=1000/380 \quad (3)$$

Figure 1:
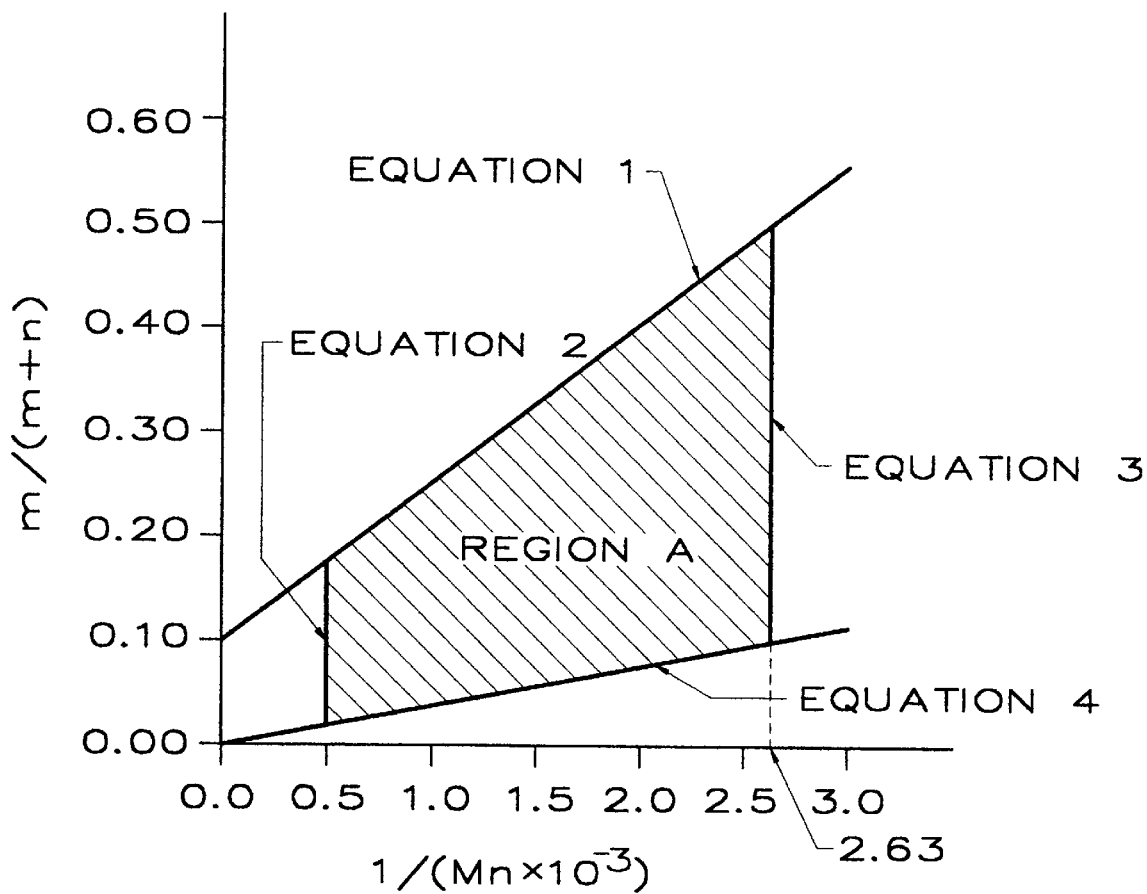
FIG. 1 is a graph of the ratio of $\underline{m}/(\underline{m}+\underline{n})$ vs. $1/(Mn \times 10^{-3})$ of the boundary conditions of the starting polymethylsilsesquioxane used to prepare the silylated composition of the invention, represented by the general formula $(CH_3SiO_{33/2})_n(CH_3Si(OH)O_{2/2})_m$, having a predetermined Mn from 380 and 2,000, as determined by gel permeation chromatography calibrated with polystyrene standards, and being defined by the region A bounded by equations.

and $$\underline{m}(\underline{m}+\underline{n})=0.034/(Mn \times 10^{-3}) \quad (4)$$

DETAILED DESCRIPTION OF THE INVENTION

The starting polymethylsilsesquioxane used to prepare the silylated polymethylsilsesquioxane of the present invention, has a number-average molecular weight (Mn, polystyrene basis) from 380 to 2,000 and is represented by $$(CH_3SiO_{3/2})_n(CH_3Si(OH)O_{2/2})_m$$

where $\underline{m}$ and $\underline{n}$ are positive numbers that provide the specified molecular weight and the value of $\underline{m}/(\underline{m}+\underline{n})$ falls within region A in FIG. 1. Region A is the region enclosed by the straight lines with equations (1) to (4) in the graph in FIG. 1 in which the x-axis plots $1/(Mn \times 10^3)$ and the y-axis plots $\underline{m}/(\underline{m}+\underline{n})$. Region A includes the intersections of the straight lines and the points on the straight lines defined by the following equations:

$$\underline{m}/(\underline{m}+\underline{n})=0.152/(Mn \times 10^{-3})+0.10 \quad (1)$$

$$1/(Mn \times 10^{-3})=1000/2000 \quad (2)$$

$$1/(Mn \times 10^{-3})=1000/380 \quad (3)$$

$$\underline{m}/(\underline{m}+\underline{n})=0.034/(Mn \times 10^{-3}) \quad (4)$$

This starting polymethylsilsesquioxane is preferably prepared in a two-phase system of water and organic solvent consisting of oxygenated organic solvent and optionally up to 50 volume % (based on the oxygenated organic solvent) hydrocarbon solvent by hydrolyzing a methyltrihalosilane MeSiX$_3$ (Me=methyl and X=halogen atom) and condensing the resulting hydrolysis product. When this preparative method is not used, the cured product afforded by the subject starting polymethylsilsesquioxane will have a reduced flexibility and/or a reduced heat resistance even when the molecular weight and silanol content satisfy the ranges specified above. In other words, polymethylsilsesquioxane with the unique characteristics described above will not be obtained.

Optimal methods for synthesizing the starting polymethylsilsesquioxane having a molecular weight and hydroxyl content in the above-specified ranges are exemplified by the following:

(1) forming a two-phase system of water (optionally containing the dissolved salt of a weak acid with a buffering capacity or a dissolved water-soluble inorganic base) and 15 oxygenated organic solvent, optionally containing no more than 50 volume% hydrocarbon solvent, adding the below-described (A) or (B) dropwise to this system to hydrolyze the methyltrihalosilane, and effecting condensation of the resulting hydrolysis product, wherein (A) is a methyltrihalosilane MeSiX$_3$ (Me=methyl and X=halogen atom) and (B) is the solution afforded by dissolving such a methyltrihalosilane in oxygenated organic solvent optionally containing no more than 50 volume % hydrocarbon solvent;

(2) the same method as described under (1), but in this case effecting reaction in the two-phase system from the dropwise addition of the solution described in (B) to only water;

(3) the same method as described under (1), but in this case effecting reaction in the two-phase system from the simultaneous dropwise addition of water and the solution described in (B) to an empty reactor.

"X," the halogen in the subject methyltrihalosilane, is preferably bromine or chlorine and more preferably is chlorine. As used herein, the formation of a two-phase system of water and organic solvent refers to a state in which the water and organic solvent are not miscible and hence will not form a homogeneous solution. This includes the maintenance of a layered state by the organic layer and water layer through the use of slow-speed stirring as well as the generation of a suspension by vigorous stirring. Below these phenomena are referred to as the "formation of two layers".

The organic solvent used in the subject preparative methods is an oxygenated organic solvent that can dissolve the methyltrihalosilane and, although possibly evidencing some solubility in water, can nevertheless form a two-phase system with water. The organic solvent can contain up to 50 volume % hydrocarbon solvent. The use of more than 50 volume % hydrocarbon solvent is impractical because this causes gel production to increase at the expense of the yield of target product. Even an organic solvent with an unlimited solubility in water can be used when such a solvent is not miscible with the aqueous solution of a water-soluble inorganic base or with the aqueous solution of a weak acid salt with a buffering capacity.

The oxygenated organic solvents are exemplified by, but not limited to, ketone solvents such as methyl ethyl ketone, diethyl ketone, methyl isobutyl ketone, acetylacetone, cyclohexanone, and so forth; ether solvents such as diethyl ether, di-n-propyl ether, dioxane, the dimethyl ether of diethylene glycol, tetrahydrofuran, and so forth; ester solvents such as ethyl acetate, butyl acetate, butyl propionate, and so forth; and alcohol solvents such as n-butanol, hexanol, and so forth. The ketone, ether, and ester solvents are particularly preferred among the preceding. The oxygenated organic solvent may also take the form of a mixture of two or more selections from the preceding. The hydrocarbon solvent is exemplified by, but again not limited to, aromatic hydrocarbon solvents such as benzene, toluene, xylene, and so forth; aliphatic hydrocarbon solvents such as hexane, heptane, and so forth; and halogenated hydrocarbon solvents such as chloroform, trichloroethylene, carbon tetrachloride, and so forth. The quantity of the organic solvent used is not critical, but preferably is in the range from 50 to 2,000 weight parts per 100 weight parts of the methyltrihalosilane. The use of less than 50 weight parts organic solvent per 100 weight parts methyltrihalosilane is inadequate for dissolving the starting polymethylsilsesquioxane product and, depending on the circumstances, will not give a starting polymethylsilsesquioxane having the desired molecular weight range, resulting in too high a molecular weight. The use of more than 2,000 weight parts organic solvent can lead to slow the hydrolysis and condensation of the methyltrihalosilane and hence result in the failure to obtain a starting polymethylsilsesquioxane in the desired molecular weight range. While the quantity of water used is also not critical, the water is preferably used at from 10 to 3,000 weight parts per 100 weight parts methyltrihalosilane.

Hydrolysis and condensation reactions are also possible even with the use of entirely additive-free water as the aqueous phase. However, such a system will give a polymethylsilsesquioxane product with an elevated molecular weight because the reaction is accelerated by the hydrogen chloride evolved from the chlorosilane. Polymetbylsilsesquioxane with a relatively lower molecular weight can therefore be synthesized through the addition of water-soluble inorganic base capable of controlling the acidity or a weak acid salt with a buffering capacity.

Such water-soluble inorganic bases are exemplified by water-soluble alkalis such as the lithium, sodium, potassium, calcium, and magnesium hydroxides. The subject weak acid salt with a buffering capacity is exemplified by, but not limited to, carbonates such as the sodium, potassium, calcium, and magnesium carbonates; bicarbonates such as the sodium and potassium bicarbonates; oxalates such as potassium trihydrogen bis(oxalate); carboxylates such as potassium hydrogen phthalate and sodium acetate; phosphates such as disodium hydrogen phosphate and potassium dihydrogen phosphate; and borates such as sodium tetraborate. These are preferably used at $\leq 1.8$ gram-equivalents per 1 mole halogen atoms from the trihalosilane molecule. In other words, these are preferably used at up to 1.8 times the quantity that just neutralizes the hydrogen halide that is produced when the halosilane is completely hydrolyzed.

The use of larger amounts facilitates the production of insoluble gel. Mixtures of two or more of the water-soluble inorganic bases and mixtures of two or more of the buffering weak acid salts can be used as long as the total is within the above-specified quantity range.

The methyltrihalosilane hydrolysis reaction bath can be stirred slowly at a rate that maintains two layers (aqueous phase and organic solvent) or can be strongly stirred so as to give a suspension. The reaction temperature is suitably in the range from room (20° C.) temperature to 120° C. and is preferably from about 40° C. to 100° C.

The starting polymethylsilsesquioxane according to the present invention may contain small amounts of units that originate from impurities that may be present in the precursors, for example, units bearing non-methyl lower alkyl, monofunctional units as represented by $R_3SiO_{1/2}$, difunctional units as represented by $R_2SiO_{2/2}$, and tetrafunctional units as represented by $SiO_{4/2}$. The starting polymethylsilsesquioxane under consideration contains the OH group and has the structure specified by the structural formula given above; however, it may also contain very small levels of OH-functional units with structures other than that specified in the said structural formula. Thus, the starting polymethylsilsesquioxane according to the present invention has a structure that substantially satisfies the conditions specified hereinabove, but it may also contain structural units generated by the causes outlined above within a range that does not impair the characteristic features of said polymethylsilsesquioxane.

The $R^1$, $R^2$, and $R^3$ in the silyl groups that silylate the hydroxyl groups in the polymethylsilsesquioxane are each selected from the hydrogen atom and substituted and unsubstituted monovalent hydrocarbon groups with the proviso that at least one of $R^1$, $R^2$, and $R^3$ is the hydrogen atom.

The technique for silylating the hydroxyl in the starting polymethylsilsesquioxane with a reactive substituent-bearing silyl group is exemplified by reaction with halosilane bearing the three substituents $R^1$, $R^2$, and $R^3$ described above; use of a nitrogenous silylating agent such as, for example, N,N-diethylaminosilane, N-silylacetamide, or hexasubstituted disilazane; reaction with a trisubstituted silanol; and reaction with hexasubstituted disiloxane in a weakly acidic milieu. When a halosilane is employed, a base can also be present in the system in order to neutralize the hydrogen halide by-product. In the case of reaction with a nitrogenous silylating agent, a catalyst such as trimethylchlorosilane or ammonium sulfate can be added. The silylation reaction under consideration can be run in the presence or absence of solvent. Solvents suitable for this reaction are, for example, aromatic hydrocarbon solvents such as benzene, toluene, and xylene; aliphatic hydrocarbon solvents such as hexane and heptane; ether solvents such as diethyl ether and tetrahydrofuran; ketone solvents such as acetone and methyl ethyl ketone; ester solvents such as ethyl acetate and butyl acetate; halogenated hydrocarbon solvents such as chloroform, trichloroethylene, and carbon tetrachloride; dimethylformamide; and dimethyl sulfoxide.

The subject silylation reaction is suitably run at from 0° C. to 200° C. and preferably at from 0° C. to 140° C.

The hydrogen-functional silylated polymethylsilsesquioxane prepared as described above exhibits good compatibility with certain polyorganosiloxanes and can therefore be used to prepare additional compositions. In addition, reaction of these compositions in the presence of curing catalyst can provide cured products with excellent physical properties. Typical examples of the subject polyorganosiloxanes are provided below, but these examples should not be construed as exhaustive.

(i) Alkenyl-functional organopolysiloxanes

These are organopolysiloxanes with the general formula $R^4_a R^5_b SiO_{(4-a-b)/2}$ ($R^4$=alkenyl, $R^5=C_1$ to $C_3$ alkyl, $\underline{a}$ is a number that provides at least two $R^4$ in each molecule, and $1.8 \leq \underline{a}+\underline{b} \leq 2.3$) that have a viscosity at 25° C. from 100 to 100,000 centipoise. Their viscosity is preferably from 100 to 50,000 centipoise and more preferably is from 300 to 10,000 centipoise.

These alkenyl-functional organopolysiloxanes can be exemplified by the following structures.

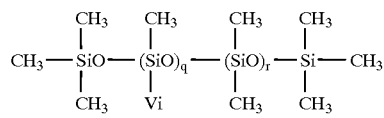

(Vi=vinyl and $\underline{q}$ and $\underline{r}$ are numbers within ranges that satisfy the conditions given above)

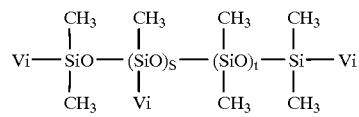

(Vi=vinyl and $\underline{s}$ and $\underline{t}$ are numbers within ranges that satisfy the conditions given above)

(ii) Organohydrogenpolysiloxanes

These are organohydrogenpolysiloxanes with the general formula $R^6_a H_b SiO_{(4-a-b)/2}$ ($R^6=C_1$ to $C_3$ alkyl, $\underline{b}$ is a number that provides at least three hydrogen atoms in each molecule, and $1.8 \leq \underline{a}+\underline{b} \leq 2.3$) that have a viscosity at 25° C. from 1 to 100,000 centipoise. Their viscosity is preferably from 100 to 50,000 centipoise and more preferably is from 1,000 to 10,000 centipoise.

These organohydrogenpolysiloxanes can be exemplified by the following structures.

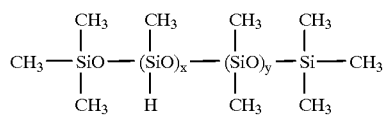

($\underline{x}$ and $\underline{y}$ are numbers within ranges that satisfy the conditions given above)

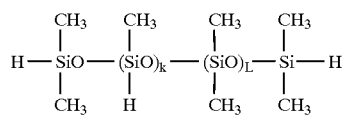

($\underline{k}$ and $\underline{L}$ are numbers within ranges that satisfy the conditions given above)

The subject polyorganosiloxanes may also be copolymers with, for example, polyalkylene oxide, e.g., polyethylene oxide or polypropylene oxide, and may even contain tetrafunctional and/or trifunctional units, in each case insofar as the above-described good compatibility is evidenced.

Curable compositions comprising the following components (1), (2), and (3) are preferred compositions according to the present invention, wherein: component (1) is a hydrogen-functional silylated polymethylsilsesquioxane in accordance with the invention; component (2) is an organopolysiloxane compound that contains on average at least 2 crosslinkable carbon-carbon double bonds in each molecule; and component (3) is a curing catalyst.

The nature of the organopolysiloxane (2) is not particularly critical as long as it is reactive with at least component (1) and can thereby provide a curable composition.

The organopolysiloxane (2) as a general matter can be any suitable selection from organopolysiloxanes that contain on average at least 2 crosslinkable carbon-carbon double bonds in each molecule. In terms of structure these organopolysiloxanes are exemplified by straight-chain organopolysiloxanes, branched organopolysiloxanes, resin-form organopolysiloxanes, and polymethylsilsesquioxanes. Combinations of two or more selections from these organopolysiloxanes may also be used as the organopolysiloxane (2).

The organopolysiloxane (2) is specifically exemplified by the alkenyl-functional organopolysiloxane (i) already defined above and by the silylated polymethylsilsesquioxane with the formula $$(CH_3SiO_{3/2})_n(CH_3Si(OH)O_{2/2})_{m-k}(CH_3Si(OSiR^1R^2R^3)O_{2/2})_k$$

in which $\underline{k}$ is a positive number smaller than $\underline{m}$, the quantity of residual silanol as calculated by $(\underline{m}-\underline{k})/(\underline{m}+\underline{n})$ does not exceed 0.12 ($\underline{m}$ and $\underline{n}$ are defined below), and $R^1$, $R^2$, and $R^3$ are each selected from substituted and unsubstituted monovalent hydrocarbon groups wherein at least 1 of said $R^1$, $R^2$, and $R^3$ is a group that contains a crosslinkable carbon-carbon double bond that is afforded by silylating the silanol groups in a starting polymethylsilsesquioxane having a predetermined number average molecular weight, Mn, from 380 to 2,000, as determined by gel permeation chromatography calibrated with polystyrene standards. The starting polymethylsilsesquioxane composition is represented by the general formula $$(CH_3SiO_{3/2})_n(CH_3Si(OH)O_{2/2})_m$$

wherein $\underline{m}$ and $\underline{n}$ are positive numbers that provide the predetermined Mn, with the proviso that the value of $\underline{m}/(\underline{m}+\underline{n})$ is less than or equal to $0.152/(Mn \times 10^{-3})+0.10$ and greater than or equal to $0.034/(Mn \times 10^{-3})$ with the formula Compositions containing the subject hydrogen-functional silylated polymethylsilsesquioxane and organopolysiloxane can be prepared by simply mixing these components when the organopolysiloxane has a low viscosity. When the organopolysiloxane has a high viscosity, these compositions can be prepared, for example, by a compounding-type blending method using a kneader or by dissolving the two components in organic solvent. This organic solvent is not critical as long as it has the capacity to dissolve both components to yield a homogeneous solution, and it can be exemplified by the aromatic hydrocarbon solvents, aliphatic hydrocarbon solvents, halogenated hydrocarbon solvents, ketone solvents, ether solvents, and ester solvents described above.

EXAMPLES

The present invention is explained in greater detail in the following through working and comparative examples, but is not limited to these examples.

REFERENCE EXAMPLE 1

2 L water and 1.5 L methyl isobutyl ketone were introduced into a reactor equipped with a reflux condenser, addition funnel, and stirrer and were stirred with sufficient vigor that 2 layers did not form. 745 g (5.0 mol) methyltrichlorosilane dissolved in 0.5 L methyl isobutyl ketone was gradually added dropwise at a rate such that the temperature of the reaction mixture did not exceed 50° C. The reaction mixture was then additionally stirred and heated for 2 hours on an oil bath at 50° C. After completion of the reaction, the organic layer was washed with water until the wash water reached neutrality and was then dried over a drying agent. The drying agent was subsequently removed and the solvent was distilled off at reduced pressure. Drying overnight in a vacuum then gave a starting polymethylsilsesquioxane as a white solid. The following results were obtained when the molecular weight distribution of this polymethylsilsesquioxane was measured by GPC calibrated with polystyrene standards (solvent=chloroform, columns=2× TSKgelGMH$_{HR}$-L (brand name) from Tosoh, instrument= HLC-8020 from Tosoh): weight-average molecular weight= 9,180; number-average molecular weight=1,060. The hydroxyl group content as determined from the $^{29}$Si-NMR spectrum (measured with an ACP-300 from Bruker) was 0.22 per silicon atom (this 0.22 corresponded to the value of m/(m+n)).

EXAMPLE 1

The interior atmosphere of a reactor equipped with a reflux condenser, addition funnel, and stirrer was replaced with argon; 10.8 g of the polymethylsilsesquioxane described in Reference Example 1 was added; and this polymethylsilsesquioxane was dissolved in 30 mL methyl isobutyl ketone. 5.02 g dimethylchlorosilane was added dropwise over 1 minute while stirring on an ice bath and the reaction was then continued for 2 hours at room temperature. After terminating the reaction by the addition of water, the organic layer was washed with water until the wash water reached neutrality. The organic layer was then dried over a drying agent. The drying agent was removed and the solvent was distilled off under reduced pressure. Drying in a vacuum for 2 days gave 11.3 g hydridodimethylsilylated polymethylsilsesquioxane as a high-viscosity liquid. The residual hydroxyl content as calculated from the $^{29}$Si-NMR spectrum was 0.05 per silicon atom in the silsesquioxane skeleton (this 0.05 corresponded to the value of (m−k)/(m+n)).

A composition was then prepared by dissolving 0.24 g of this hydridodimethylsilylated polymethylsilsesquioxane and 2.5 g polydimethylsiloxane bearing vinyl at both terminals (vinyl content=0.12 weight %, viscosity 9,000 centistokes) in 5.6 g toluene with thorough stirring followed by the addition of a platinum-divinyltetramethyldisiloxane complex so as to give 400 ppm platinum atoms relative to vinyl and the addition of 2-methyl-3-2-ol at 10-fold (molar) the amount of platinum. The SiH/vinyl molar ratio afforded by these additions was 4:1, while the hydridodimethylsilylated polymethylsilsesquioxane accounted for 8.8 weight % of its mixture with the polydimethylsiloxane. The solution was made into a film; the solvent was eliminated; and a trial cure of the polydimethylsiloxane by the hydridodimethylsilylated polymethylsilsesquioxane was then carried out by heating for 12 hours at 100° C. and for 2 hours at 130° C. The film exhibited an excellent transparency, which indicated good compatibility between the hydridodimethylsilylated polymethylsilsesquioxane and polydimethylsiloxane.

This film was subjected to tensile testing as described in JIS K 6301. Yielding was not exhibited in the stress-strain curve, and the 10% modulus (stress divided by strain at 10% strain) was 0.4 MPa. These results confirmed that the hydridodimethylsilylated polymethylsilsesquioxane had functioned as a crosslinker in the platinum-catalyzed hydrosilylation-based cure of the polydimethylsiloxane.

COMPARATIVE EXAMPLE 1

When the attempt was made to disperse the starting, nonsilylated polymethylsilsesquioxane described in Reference Example 1 into the vinyl-endblocked polydimethylsiloxane described in Example 1 using the same weight proportions as in Example 1, the mixture was opaque after solvent removal, which indicated that the facile dispersion achieved with the hydridodimethylsilyated polymethylsilsesquioxane had not occurred in this case. Since the nonsilylated polymethylsilsesquioxane lacked silicon-bonded hydrogen, it of course could not function as a crosslinker in hydrosilylation-based curing.

REFERENCE EXAMPLE 2

Using a reactor as described in Example 1, 70 g of the starting polymethylsilsesquioxane described in Reference Example 1 was dissolved in 210 mL methyl isobutyl ketone. 41.0 g vinyldimethylchlorosilane was added dropwise over 3 minutes on an ice bath followed by reaction for 1 hour at room temperature. Work up as in Example I gave 71.6 g vinyldimethylsilylated polymethylsilsesquioxane as a solid with a very slight fluidity. The residual hydroxyl content as calculated from the $^{29}$Si-NMR spectrum was 0.05 per silicon atom in the silsesquioxane skeleton.

EXAMPLE 2

1.56 g of the hydridodimethylsilylated polymethylsilsesquioxane described in Example 1 and 1.70 g of the vinyldimethylsilylated polymethylsilsesquioxane described in Reference Example 2 were dissolved in 2 g toluene. To this was added a platinum-divinyltetramethyldisiloxane complex so as to give 200 ppm platinum atoms relative to vinyl and 0.42 mg 2-methyl-3-butyn-2-ol. A cured polymethylsilsesquioxane film was then obtained by heating for 12 hours at 100° C. and for 2 hours at 130° C. A storage modulus of 2 GPa was measured when this film was subjected to tensile-mode dynamic viscoelastic testing at a test temperature of 20° C. and a test frequency of 1 Hz. This cured film had the same flexibility as the cured product afforded by condensation of the silanol in the starting polymethylsilsesquioxane disclosed by the present inventors in EP 786 489 Al and WO 9707164. When a stand-alone film with a thickness of 90 μm was subjected to flexural testing using the flexural tester of JIS K-5400, the film did not break or crack even when bent 180° over a rod with a diameter of 2 mm.

By equipping a starting polymethylsilsesquioxane that has a unique property set with silicon-bonded hydrogen functionality, the present invention imparts thereto compatibility with organopolysiloxanes and at the same time makes this polymethylsilsesquioxane into a crosslinker for the polyaddition-based cure or addition polymerization-based cure of organopolysiloxane functionalized with crosslinkable carbon-carbon double bonds. The present invention also thereby makes possible the generation of advantageous effects from the addition of the subject polymethylsilsesquioxane. Moreover, at the same time that cure of the polymethylsilsesquioxane of the invention by polyaddition or addition polymerization has been made possible, this polymethylsilsesquioxane has also been made into a crosslinker of, for example, silicone resin functionalized with crosslinkable carbon-carbon double bonds. Finally, a crosslinker with unique properties is obtained since the precursor polymethylsilsesquioxane itself has a unique property set.

We claim:

1. A composition comprising a hydrogen-functional silylated polymethylsilsesquioxane, said composition being prepared by silylating a starting polymethylsilsesquioxane having a predetermined number average molecular weight, Mn, from 380 to 2,000, as determined by gel permeation chromatography calibrated with polystyrene standards, said starting polymethylsilsesquioxane being represented by the general formula $$(CH_3SiO_{3/2})_n(CH_3Si(OH)O_{2/2})_m$$

wherein $\underline{m}$ and $\underline{n}$ are positive numbers that provide the predetermined Mn, with the proviso that the value of $\underline{m}/(\underline{m}+\underline{n})$ is less than or equal to $0.152/(Mn \times 10^3)+0.10$ and greater than or equal to $0.034/(Mn \times 10^{-3})$; said silylated polymethylsilsesquioxane having the formula $$(CH_3SiO_{3/2})_n(CH_3Si(OH)O_{2/2})_{m-k}(CH_3Si(OSiR^1R^2R^3)O_{2/2})_k$$

wherein $\underline{k}$ is a positive number smaller than $\underline{m}$, $(\underline{m}-\underline{k})/(\underline{m}+\underline{n})$ is less than or equal to 0.12, and $R^1$, $R^2$, and $R^3$ are each selected from substituted and unsubstituted monovalent hydrocarbon groups wherein at least 1 of said $R^1$, $R^2$, and $R^3$ is a hydrogen atom.

2. A hydrogen-functional silylated polymethylsilsesquioxane in accordance with claim 1, wherein said starting polymethylsilsesquioxane is prepared by hydrolyzing a methyltrihalosilane of the general formula $MeSiX_3$, wherein Me is methyl and X is a halogen atom, and condensing the resulting hydrolysis product, and wherein said preparation is carried out in a two-phase system of water and organic solvent comprising oxygenated organic solvent and up to 50 volume %, based on the oxygenated organic solvent, of a hydrocarbon solvent.

3. A curable composition comprising:

(1) a hydrogen-functional silylated polymethylsilsesquioxane in accordance with claim 1;

(2) an organopolysiloxane compound that, on average, includes at least 2 crosslinkable carbon-carbon double bonds in each molecule; and (3) a hydrosilation curing catalyst.

* * * * *